(12) United States Patent
Van Zandt

(10) Patent No.: US 11,285,982 B2
(45) Date of Patent: Mar. 29, 2022

(54) ELEVATED PIVOT BRACKET FOR A WHEELBARROW

(71) Applicant: Douglas Van Zandt, White Salmon, WA (US)

(72) Inventor: Douglas Van Zandt, White Salmon, WA (US)

( * ) Notice: Subject to any disclaimer, the term of this patent is extended or adjusted under 35 U.S.C. 154(b) by 249 days.

(21) Appl. No.: 15/903,004

(22) Filed: Feb. 22, 2018

(65) Prior Publication Data

US 2018/0237045 A1  Aug. 23, 2018

Related U.S. Application Data

(60) Provisional application No. 62/462,107, filed on Feb. 22, 2017.

(51) Int. Cl.
*B62B 1/24* (2006.01)
*B62B 1/22* (2006.01)

(52) U.S. Cl.
CPC .................. *B62B 1/24* (2013.01); *B62B 1/22* (2013.01); *B62B 2203/05* (2013.01)

(58) Field of Classification Search
CPC .. B62B 1/18; B62B 1/20; B62B 1/204; B62B 1/23
USPC ....................................................... 280/47.31
See application file for complete search history.

(56) References Cited

U.S. PATENT DOCUMENTS

| | | | | |
|---|---|---|---|---|
| 3,282,600 A | * | 11/1966 | Tonelli ...................... | B62B 1/18 280/47.31 |
| 3,950,005 A | * | 4/1976 | Patterson .................. | B62B 5/04 280/47.31 |
| 4,190,260 A | * | 2/1980 | Pearce ....................... | B62B 1/18 280/47.31 |
| 4,270,786 A | * | 6/1981 | Mattox ...................... | B62B 1/24 280/47.32 |
| 5,026,079 A | * | 6/1991 | Donze ....................... | B62B 1/20 280/47.31 |
| 5,033,760 A | * | 7/1991 | Evans ........................ | B62B 1/20 280/47.26 |
| 5,087,061 A | * | 2/1992 | Wallace .................... | B62B 1/20 280/30 |
| 5,149,116 A | * | 9/1992 | Donze ....................... | B62B 1/20 280/47.26 |
| 5,242,177 A | * | 9/1993 | Morris ...................... | B62B 1/20 280/47.31 |
| 5,509,681 A | * | 4/1996 | Keller ...................... | B62B 1/002 280/415.1 |
| 5,531,463 A | * | 7/1996 | Givens ...................... | B62B 1/22 280/47.2 |
| 5,810,375 A | * | 9/1998 | Hoffarth ................... | B62B 5/06 16/446 |
| 5,924,708 A | * | 7/1999 | Bisaillon ................... | B62B 1/18 280/47.26 |
| 6,886,838 B1 | * | 5/2005 | Zimmerman ............. | B62B 1/22 280/47.31 |
| 6,908,088 B2 | * | 6/2005 | Feick ........................ | B62B 1/18 280/47.131 |

(Continued)

*Primary Examiner* — Jeffrey J Restifo

(57) ABSTRACT

A pivot bracket for a wheelbarrow having a bight with a ground-engaging portion positioned so as to enable a large pivoting angle of the wheelbarrow. In some preferred embodiments, the ground engaging portion is positioned forward of the wheel of the wheelbarrow and above the axis of rotation of the wheel.

13 Claims, 8 Drawing Sheets

(56) References Cited

U.S. PATENT DOCUMENTS

| | | | | |
|---|---|---|---|---|
| 7,866,686 B2* | 1/2011 | Conaway | ............... | B62B 1/208 |
| | | | | 280/653 |
| 7,900,939 B2* | 3/2011 | Robinson | ................ | B62B 1/18 |
| | | | | 280/47.31 |
| 7,934,728 B2* | 5/2011 | Strobel | ................... | B62B 1/18 |
| | | | | 280/47.21 |
| 8,997,658 B2* | 4/2015 | Pipkorn | ............... | B62B 5/0013 |
| | | | | 108/42 |
| 8,998,221 B1* | 4/2015 | Frenkel | ................... | B62B 1/18 |
| | | | | 280/47.33 |
| 10,124,820 B2* | 11/2018 | Meyer | ................... | B62B 5/0006 |
| 10,322,736 B1* | 6/2019 | Duffin | ..................... | B62B 1/18 |

* cited by examiner

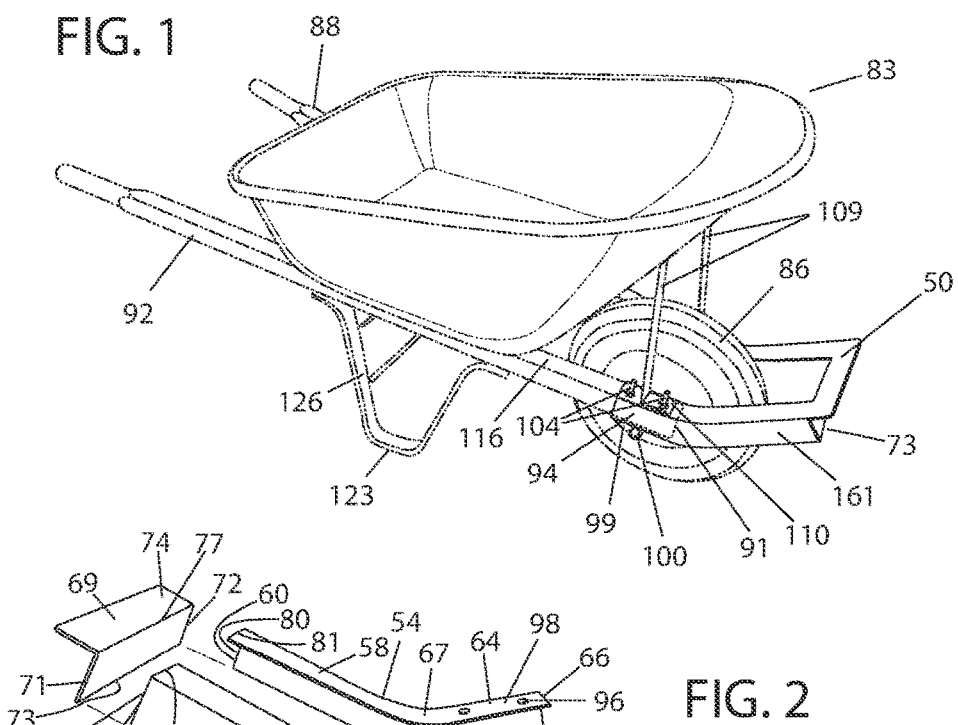
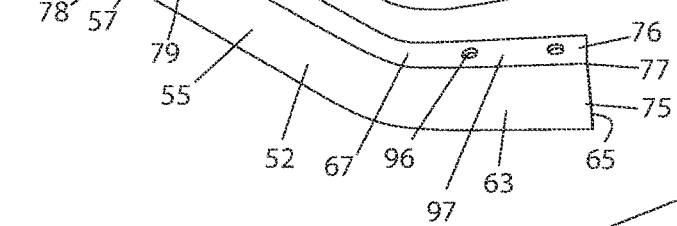
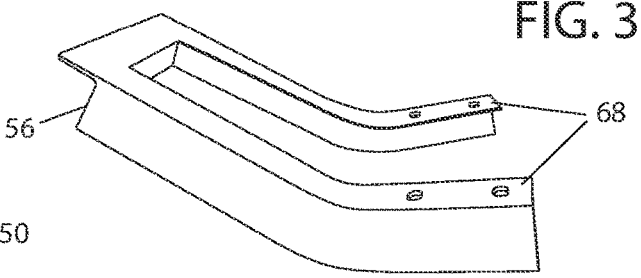
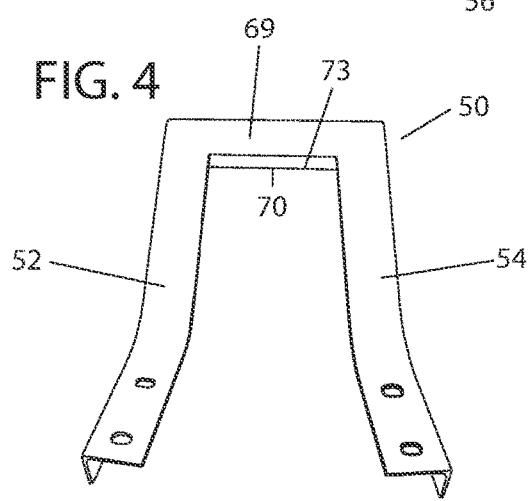

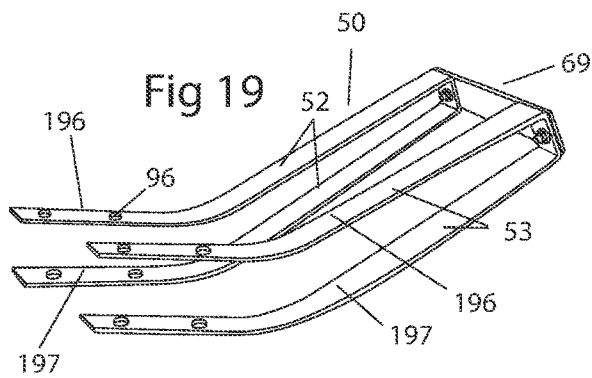
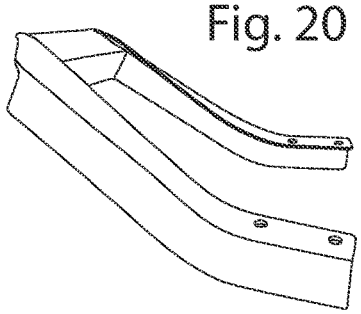
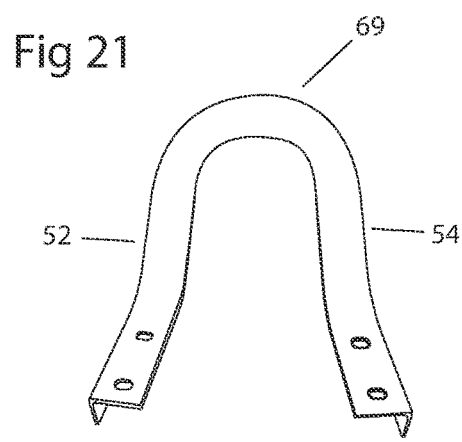
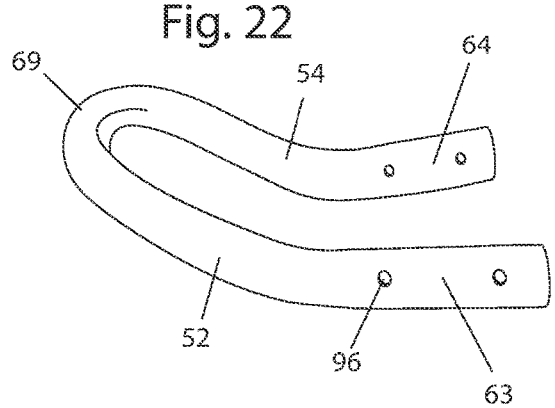
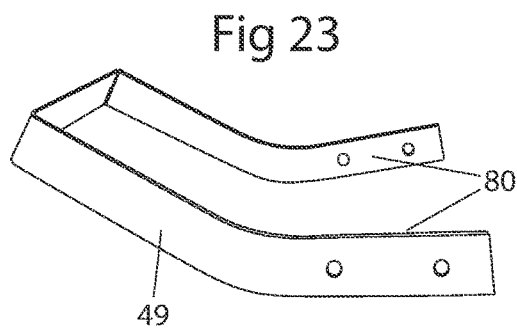
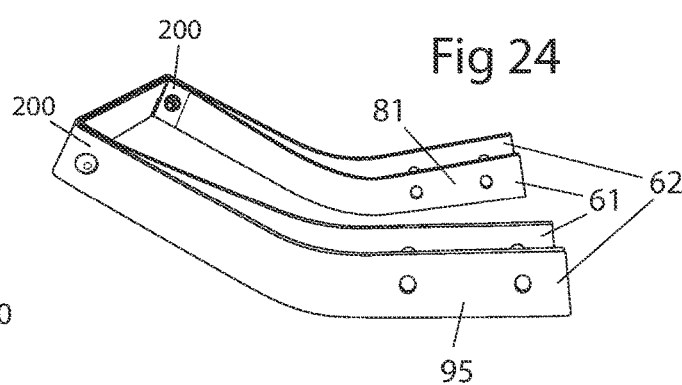
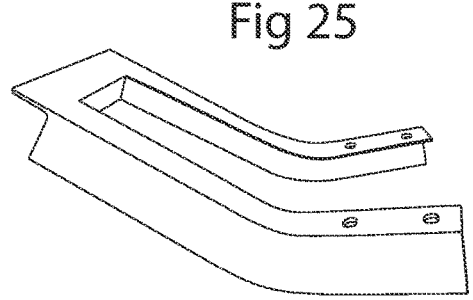
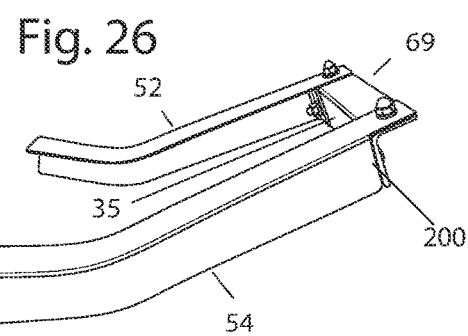

ELEVATED PIVOT BRACKET FOR A WHEELBARROW

BACKGROUND

Wheelbarrows are one of the oldest inventions, are used to manually move material in many different types of terrain. Wheelbarrows have a tray (platform, cargo-carrying bin, tub, hopper), a frame assembly comprising two handle portions, support legs, and a wheel. Wheelbarrow operators regularly experience poor ergonomic posture when navigating wheelbarrows in uneven terrain. Having a wheelbarrow design that improves the ergonomic operation of wheelbarrows in uneven terrain is needed.

BRIEF DESCRIPTION OF THE DRAWINGS

For a better understanding of the invention, and to show how the same may be carried into effect, reference will now be made, by way of example, to the accompanying drawings, in which:

FIG. 1 shows a wheelbarrow with the first embodiment of the elevated pivot bracket for wheelbarrow installed.

FIG. 2 shows an exploded view of first embodiment of pivot bracket.

FIG. 3 shows side perspective of first embodiment of the pivot bracket.

FIG. 4 shows overhead perspective of first embodiment of the pivot bracket.

FIG. 19 shows a side perspective of the third embodiment of a pivot bracket.

FIG. 20 shows a side perspective of the fourth embodiment of a pivot bracket.

FIG. 21 shows side perspective of the fifth embodiment of a pivot bracket.

FIG. 22 shows side perspective of the sixth embodiment of a pivot bracket.

FIG. 23 shows side perspective of the seventh embodiment of a pivot bracket.

FIG. 24 shows side perspective of the eighth embodiment of a pivot bracket.

FIG. 25 shows side perspective of the ninth embodiment of a pivot bracket.

FIG. 26 shows side perspective of the tenth embodiment of a pivot bracket.

FIG. 43 shows an overhead view of the front section of a wheelbarrow showing partial handles, the tire, and the twelfth embodiment pivot bracket.

FIG. 44 shows a side perspective of a wheelbarrow with the thirteenth embodiment of the pivot bracket.

DETAILED DESCRIPTION

Figure 5:
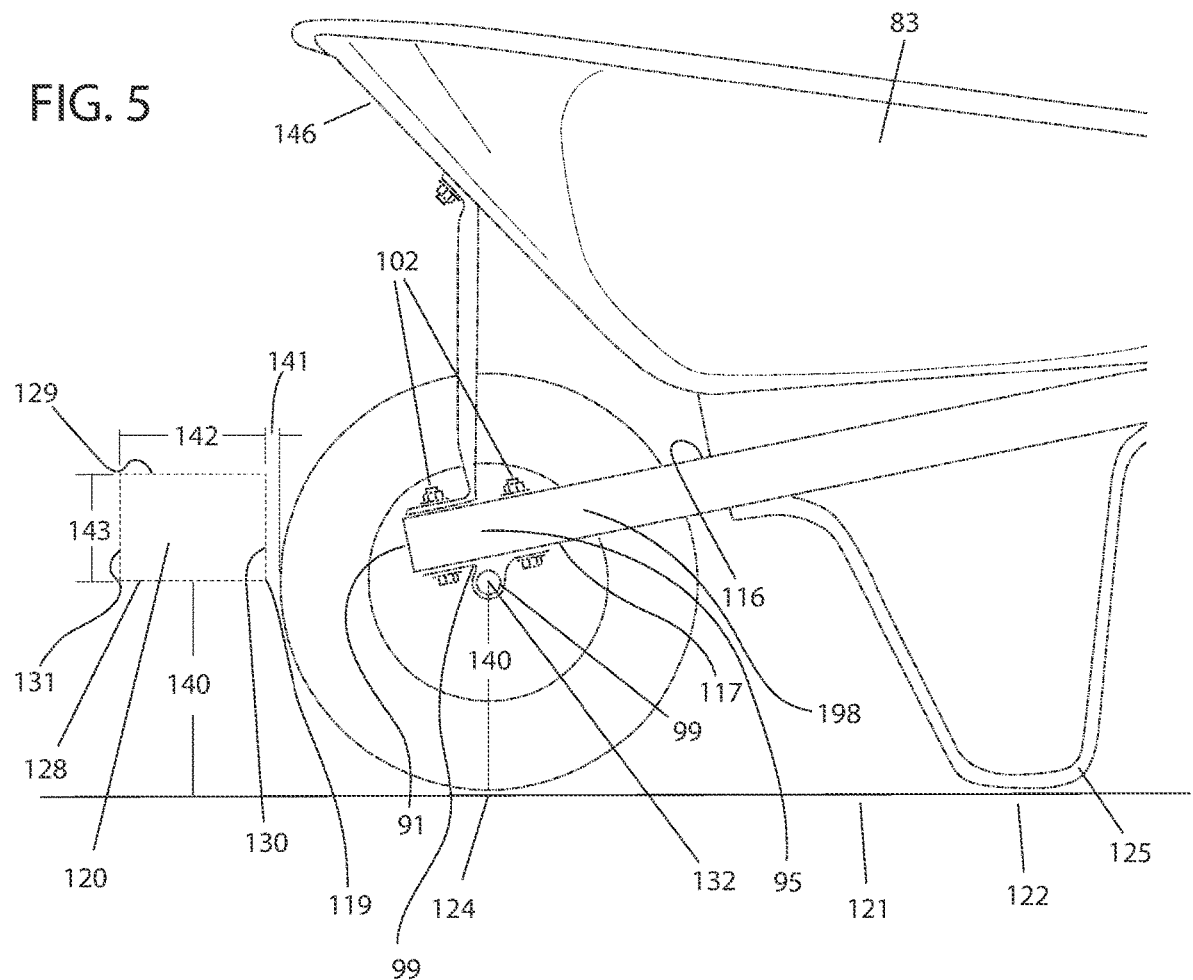
FIG. 5 shows orthogonal view of a wheelbarrow, with the pivot bracket removed and situated on a flat level surface, identifying the range of location for the pivot bracket lower forward edge as well as two of the three wheelbarrow contact points to the flat level surface.

FIG. 1 shows a first embodiment of an elevated pivot bracket for wheelbarrow 50 coupled to a wheelbarrow 83 via a first wheelbarrow handle 88 and a second wheelbarrow handle 92 and more specifically at a first handle/leg coupling section 95 (shown in FIG. 7) and a second handle/leg coupling section 94. FIG. 2 shows the first embodiment of a elevated pivot bracket 50 formed as a L cross-sectional shape 74 and is preferably made of metal material, such as iron, steel, aluminium etc., although those of ordinary skill in the art will recognize that other suitable materials may be used, such as glass reinforced plastic, carbon fiber, or plastic. Other shapes are suitable such as, but not limited to, a U cross-sectional shaped member 115 (Shown in FIGS. 38, 39, 40, and 41). The pivot bracket 50 has a plurality of sections comprising a first support leg 52, a bight 69, and a second support leg 54. The L shape 74 (shown in FIGS. 2, 34, 35, 36, and 37) has a plurality of legs comprising a vertically oriented leg 75 and a horizontally oriented leg 76. The legs 75 and 76 are connected at an angle 77.

The support legs 52 and 54 each have a plurality of sections comprising a first leg/bight support section 55, and a first leg/handle coupling section 63, a second leg/bight support section 58, and a second leg/handle coupling section 64. The support legs 52 and 54 each have proximal and distal ends comprising a first leg/bight distal end 57, a first leg/handle proximal end 65, a second leg/bight distal end 60, and a second leg/handle proximal end 66. The leg/bight distal ends 57 and 60 have a plurality of forward edges comprising a first leg/bight vertically oriented distal edge 78, a first leg/bight distal horizontally oriented edge 79, and a second leg/bight distal vertically oriented edge 80 and a second leg/bight distal horizontally oriented edge 81.

The bight 69 has a plurality of ends comprising a bight first vertically oriented distal end 71 and a bight second vertically oriented distal end 72. The support legs 52 and 54 have an upwards incline transition section 67 at a predetermined angle, between 5 and 40 degrees, located forward of a leg/handle coupling section 63 and 64 which is approximately between 6 cm and 20 cm in length. The longitudinal axis of the first leg/handle coupling section 63 of the first support leg 52 (shown in FIG. 2) is structured to align approximately with the longitudinal axis of the first handle/leg coupling section 95 (shown in FIG. 7) of the first handle 88 (shown in FIG. 1). The longitudinal axis of the second leg/handle coupling section 64 of the second support leg 54 (shown in FIG. 2) is structured to align approximately with the longitudinal axis of the second leg handle/leg coupling section 94 of the second handle 92 (shown in FIG. 1). A bight forward lower edge or surface 73 (shown in FIGS. 2 and 4) is generally positioned to be parallel to a centerline of a rotational axis of the wheel/tire 132 (shown in FIG. 5).

The bight 69 is the middle section of the pivot bracket 50 (shown on FIG. 2, 4, 19, 21, 22, 26, 42). When coupling the first support leg 52, the bight 69, and the second support leg 54 (shown in FIG. 2) the first leg/bight distal vertically oriented edge 78 is positioned adjacent to and generally aligning with the bight first distal vertically oriented edge 71, the second leg/bight distal vertically oriented edge 80 is positioned adjacent to and generally aligned with the bight second distal vertically oriented end 72. The method of physically coupling the parts is described below.

A first leg/handle coupling horizontally oriented section 97 and a second leg/handle coupling horizontally oriented section 98 have a plurality of a holes 96 located at predetermined locations (shown in FIG. 2) to align with a first axle bracket coupling fasteners 102 (shown in FIG. 5) and a second axle bracket coupling fasteners 104 (shown in FIG. 1). The holes 96 (shown in FIG. 2) are for coupling the pivot bracket 50 to the wheelbarrow 83 (FIG. 1). An axle brackets 99 (shown in FIGS. 1 and 5) couple an axel 100 to the handles 88 and 92. The axle 100 rotatably couples a wheel/tire 86 (shown in FIG. 1) to the handles 88 and 89.

The holes 96 (shown in FIG. 2) can range from a circular hole, to a square hole to an ovalized hole (rectangular with radiused ends) to rectangular holes. Diameter dimensions for a round hole range from 0.6 cm to 1.9 cm. Single side dimension for square holes can range from 0.6 cm to 1.9 cm. For ovalized and rectangular holes the width can range from 0.6 cm to 1.9 cm and the length can range from 0.6 cm to 3.8 cm. The orientation of holes relative to the positioning on a top surface of leg/handle coupling section 68 can have a front to back as well as a side-to-side orientation +/−30 degrees (shown in FIG. 3).

Range of Location

The bight 69 is the middle section of the pivot bracket 50 (shown in FIG. 2). It spans between the first support leg 52 and the second support leg 54. The bight lower forward edge or surface 73 is located within a range of location rectangle 120 within the range of location rectangle 120 (shown in FIG. 5). More specifically a center of bight forward edge or surface 70 (shown in FIG. 4) is located at the center of bight 69 within +/−20% of length of the width of bight 69, or the bight lower forward edge or surface 73 (shown in FIG. 4). A description of the location of range rectangle 120 is described below.

FIG. 5 shows an orthogonal view of the wheelbarrow 83 with the pivot bracket 50 removed to identify the range rectangle 120 for the location of the bight lower forward edge or surface 73 (shown in FIG. 4). The range rectangle 120 is not an actual part of pivot bracket 50. The range 120 is a two-dimensional rectangle and is used to define the range of location of an important part of the pivot bracket 50, the bight lower forward edge or surface 73, relative to the wheelbarrow it is mounted on (seen in FIG. 4). In FIG. 5 the range 120 is located in the following described location when a wheelbarrow on flat level surface 146 is located on a flat level surface 121. The wheelbarrow 146 has a plurality of contact points with the flat level surface 121 comprising a first wheelbarrow support leg/flat level surface contact point 122, a second wheelbarrow support leg/flat level surface contact point 123 (shown in FIG. 1) and a wheel/tire/flat level surface contact point 124. Shown in FIG. 6 the range 120 is parallel to a forward and back centerline plane of a wheelbarrow 144 and is perpendicular to rotational axis of the wheel 132.

Shown in FIG. 5 the four sides of the range 120 comprising a lower range of location boundary 128, a back range of location boundary 130, an upper range of location boundary 129, and a forward range of location boundary 131. The upper boundary 129 and lower boundary 128 are both parallel to the flat level surface 121. The front boundary 131 and the back boundary 130 are parallel to each other and perpendicular to the flat level surface 121. The intersection of the lower boundary 128 and back boundary 130 is a reference location 119. A radius dimension of properly inflated tire 140 is the distance the reference location 119 is located above flat level surface 121. The reference location 119 is located forward of centerline the rotational axis of the wheel 132 by the distance of the radius 140 plus 1.3 cm. The front boundary 131 is forward of the back boundary 130 by approximately 15.4 cm. 14 cm+/−10% distance. The upper boundary 129 is above the lower boundary 128 by approximately 12 cm.

The range 120 (shown in FIG. 5) is the range that the bight forward lower surface 73 is located in when the elevated pivot bracket 50 is coupled on wheelbarrow 146. The range 120 boundaries form a rectangle cross-section and is located above the level surface 121 by a measurement equal to approximately the radius of outside diameter of properly inflated tire 140+/−20% of tire diameter. Standard wheelbarrow industry tires are approximately 40.5 cm+/−10% in diameter. The pivot bracket 50 can be manufactured to work with a very large range of tire diameters from 25 cm to 60 cm.

Range Boundary

Shown in FIG. 5 the lower range of location boundary 128 is parallel to the flat level surface 121 in both the side-to-side and front-to-back orientations. The upper range boundary 129 is parallel to the back range of location boundary 130 is forward of the rotational axis of the wheel 132 by approximately the distance of radius 140 plus 1.3 cm. The back range boundary 130 is parallel to the centerline 144 and perpendicular to the level surface 121.

The forward range boundary 131 is parallel to the centerline 144 and is perpendicular to the flat level surface 121.

Fabrication of an example of the first embodiment of the pivot bracket 50 (shown in FIG. 1) may be accomplished by those having ordinary skills in the arts. Three pieces of metal of a predetermined size and thickness should be cut out of a larger piece of steel using metal cutting device, such as a metal sheer, to create the support legs 52 and 54 and the bight 69 (shown in FIG. 2). Material dimensions for this example are as follows: 23 cm×10 cm for the bight 69, and two pieces 37 cm×10 cm for the support legs 52 and 54. Material thickness is 0.32 cm for all three pieces. The pieces should be formed or bent to the L shape 74 to predetermined specifications by a tool such as a metal brake. The support legs 52 and 54 should then have the holes 96 holes created in the predetermined locations in the leg/handle coupling section 97 and 98 (shown in FIG. 2) by a tool such as a drill press. The support legs should have the net upwards incline 67 (shown in FIG. 2) formed in them to 20 degrees with a tool such as a Hossfeld Bender.

All surfaces of the three pieces should have all surfaces properly prepared to predetermined specification for coupling such as deburring edges with a tool such as a sander. The support legs 52 and 54 and the bight 69 should be properly positioned and secured for coupling (shown in FIG. 2) with tools such as clamps and jigs. The joints between the support legs 52 and 54 and the bight 69 should be bonded (shown in FIG. 2) with a tool such as a welder. All surfaces should be should be properly prepared for applying desired finish. Range for finish preparation spans doing nothing for a raw untouched finish to grinding/sanding welds and surfaces smooth to make them invisible and polishing entire surface to an ultra smooth flawless surface for a finish of a clear coat or chroming with a tool such as a sander. Once prepared a finish such as paint may be applied with a can of spray paint. For this example the parts should be sanded and painted.

Installation

Figure 8:
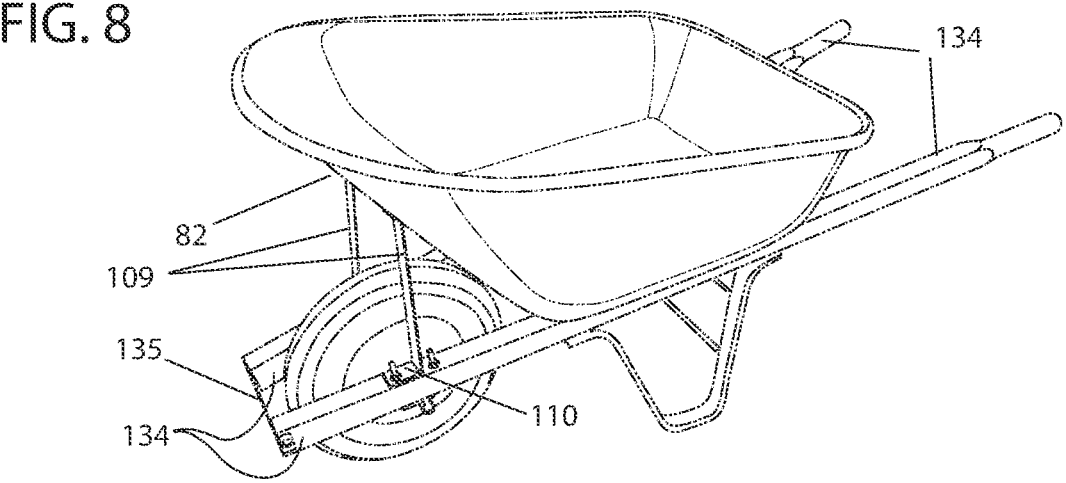
FIG. 8 shows a standard wheelbarrow with its handles, tray, and wheel.

Those having ordinary skills in the arts should be able to install the pivot bracket 50 onto the wheelbarrow 83 (shown in FIG. 1). An appropriated place to start the installation of the pivot bracket is ensuring the handles 88 and 92 are the proper length (shown in FIG. 1). In new construction the handles would be specified to have a predetermined length whose forward end is a forward end of a handle/leg coupling section 91 (shown in FIG. 1, 5). The forward end 91 is located between approximately 2.5 cm to 12 cm. forward of a plane that runs through the rotational axis of the wheel-132 (shown in FIGS. 5 and 6). When retrofitting an existing standard wheelbarrow 82 (shown in FIG. 8) the handles 88 and 92 (shown in FIG. 1) should be adjusted, if needed, to have the forward end 91 (shown in FIGS. 1 and 5) in the correct place with a tool such as a saw, to cut the handle to the correct length. For this example of the first embodiment the handles forward end of a handle/leg coupling section 91 will be 8 cm forward of the rotational axis of the wheel 132.

When assembling a new wheelbarrow with the pivot bracket 50 the installation of the actual pivot bracket may be done near the end of the process. All parts, with the exception of the pivot bracket 50 (shown in FIG. 1) would be assembled with fasteners in place, but not tightened, according to the manufacturers assembly manual. The axle bracket fasteners 102, 104 would be removed (shown in FIGS. 1 and 5). The leg/handle coupling section 63 and 64 (shown in FIG. 2) would be positioned on the handle/leg coupling section 90 (shown in FIG. 7) and 94 of the handles 88 and 92 (shown in FIG. 1). The handle/leg coupling section 90 and 94 extends approximately forward 12 cm and behind 12 cm a plane that runs through the rotational axis of the wheel 132 (shown in FIG. 6). If the wheelbarrow 83 has a tray support 109 specified in bill of material, then during assembly a lower tray support flange 110 (shown in FIG. 8) may be positioned on a top surface of leg/handle coupling section 68 (shown in FIG. 3). Once the pivot bracket 50 is properly positioned the axle bracket coupling fasteners 102 and 104 should be replaced and tightened to manufacturers specifications. All other fasteners for wheelbarrow would be tightened to manufacturers specification (shown in FIGS. 1 and 5).

When retrofitting an existing wheelbarrow the axle bracket fasteners 102 and 104 would be removed (FIGS. 1 and 5). The leg/handle coupling section 63 and 64 (FIG. 2) would be positioned on a handle/leg coupling section 95 (FIG. 5), 94 of the handles 88 and 92 (FIG. 1). The handle/leg coupling section 90 and 94 extends forward 12 cm and behind 12 cm a plane that runs through the rotational axis of the wheel 132 (shown in FIG. 5). If the wheelbarrow 83 has the tray supports 109 then during assembly a lower tray support flange 110 may be positioned on the top surface of leg/handle coupling section 68 (shown in FIG. 3). Once the pivot bracket 50 (shown in FIG. 1) is properly positioned the axle bracket coupling fasteners 102, 104 should be replaced and the fasteners 102 and 104 should be tightened to manufacturers specifications (shown in FIGS. 1 and 5).

Operation

Figure 7:
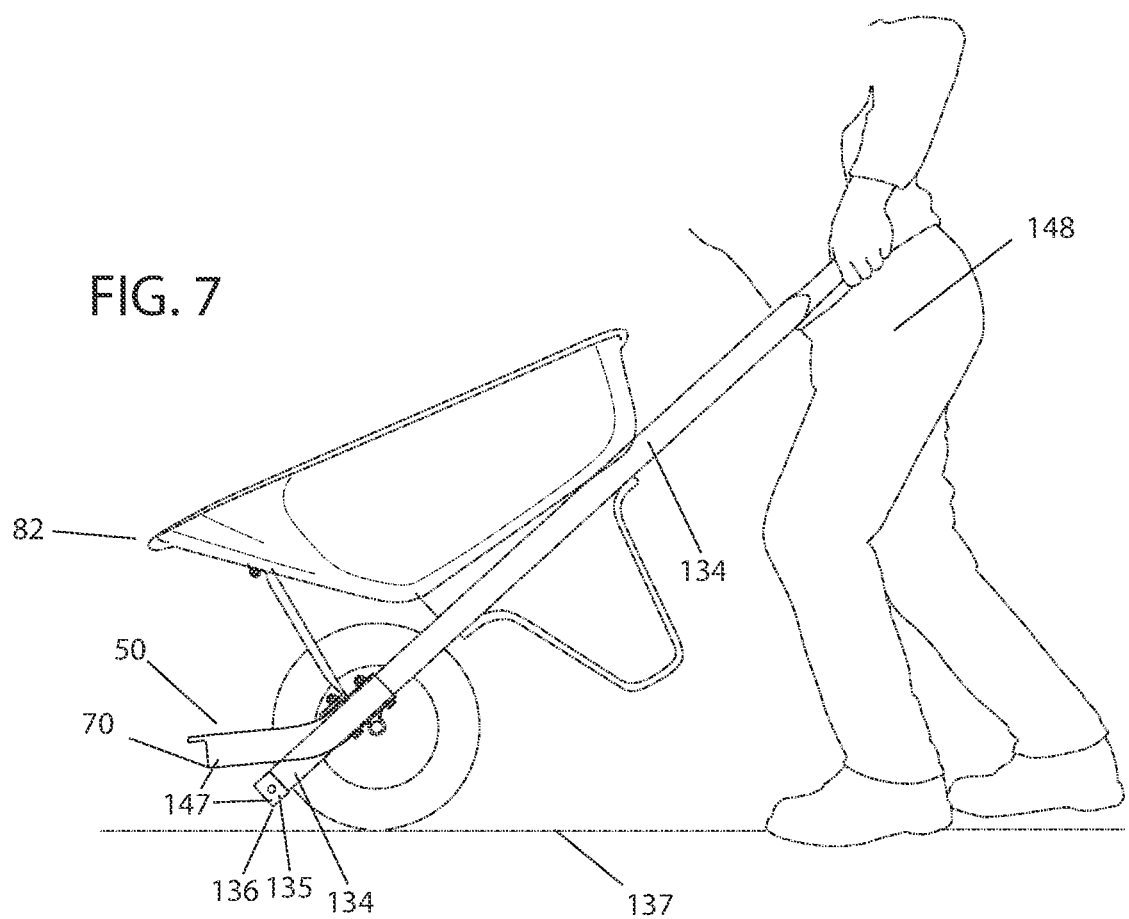
FIG. 7 shows orthogonal view of a wheelbarrow with an elevated pivot bracket installed as well as with standard wheelbarrow full-length handles and wheel guard. This perspective shows the wheelbarrow in a tipped operational mode with an operator, to show the elevation differences between the bottom forward edge of the pivot bracket versus the bottom edge of a standard wheelbarrow's lower edge of its wheel guard, relative to surface the wheelbarrow is being operated.

Shown in FIG. 7 wheelbarrows with pivot bracket 50 installed are operated normally on a surface being operated on 137 if they are flat and level. However in uneven terrain the elevated height of the lower edge of bight 73 may reduce the chances of a structure forward of the wheel 147 from coming in contact with objects on or protruding up from the ground. If the forward structure 147 comes in contact with the surface 137 while operator is pushing the wheelbarrow in a forward direction the wheelbarrow may stop and inadvertently empty. FIG. 7 shows an existing standard wheelbarrow 82 with an pivot bracket 50 installed, however a stock length handles 134 remain their original length and a wheel bumper 135 is installed (shown in FIGS. 7 and 8) for the purposes of contrasting the differences between a standard wheelbarrow 82 (shown in FIG. 8), and one with the pivot bracket 50 installed (shown in FIG. 7).

FIG. 7 shows the position of a wheelbarrow 82 in operational mode being pushed by a 183 cm tall operator 148. A lower edge of wheel bumper 136 is very close to a surface being operated on surface 137. The distance between a bumper lower edge 136 and surface 137 will vary depending numerous variables comprising the height of the operator and weight of the load in the wheelbarrow 82, whether the operator is going up or down an incline. As shown in FIG. 7 the distance is between the lower edge of wheel bumper and surface 137 is approximately 4 cm. whereas the distance between the bight forward edge 73, of the pivot bracket 50, is approximately 11 cm over surface 137. When operating the wheelbarrow 83 with a standard length handles 134 and wheel bumper 135, (shown in FIG. 7), the lower bumper edge 136 may come in contact with objects on the ground greater than 4 cm. in height whereas with pivot bracket 50 installed, as described above, the objects would need to be 11 cm in height for contact to occur. An operator 148 may have to lower the handles, by bending over or walking at a lowered position, incurring poor posture, to keep wheelbarrow 82 with stock length handles 134 and wheel bumper 135 from striking the ground in uneven terrain, or going from a level surface up an inclined surface, or down an inclined to a level surface. Whereas the operator 147, in the same scenario, with an pivot bracket 50 properly installed, as described above, should be able to navigated the same terrain with a reduced chance having the forward structure of the wheelbarrow 147 come in contact with the ground. Therefore reducing the chances of inadvertently dumping the wheelbarrow load as a result of the structure of forward wheels 147 coming in contact with the ground and having an increased chance of operating the wheelbarrow with improved posture.

Figure 9:
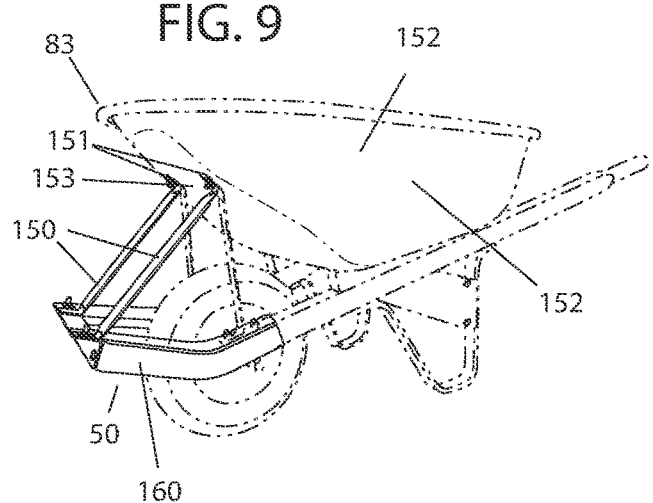
FIG. 9 shows a wheelbarrow with the second embodiment of a pivot bracket and it's connection struts.

FIG. 9 shows a second embodiment of pivot bracket 50. Wheelbarrows designed and built for transporting heavy loads such as concrete may require additional connection between the pivot bracket 50 and a forward surface of the wheelbarrow tray 153. A connection strut 150 provides the connection. A wheelbarrow tray 152 is the part of the wheelbarrow where the material the wheelbarrow is carrying is contained. Manufacturers may specify a plurality of struts 150. The connection strut 150 provides connection between the forward section of the pivot bracket 50 and the forward surface of the wheelbarrow tray 153. The struts 150 attach to the forward area of the pivot bracket 50, covered below, and to the forward surface of wheelbarrow tray 153 covered below. The struts 150 have an attachment flange 151 on either end. The flanges 151 have a flange hole 156. The struts 150 may be fabricated out of flat metal, although those of ordinary skill in the art will recognize that other suitable shapes may be used such as square, round or other readily available shapes as well as custom shapes. The shapes may be solid or hollow. The strut 150 may constructed out other materials, although those of ordinary skill in the art will recognize that other suitable materials such as, but not limited to, aluminium, glass reinforced plastic, carbon fiber may be used.

Figure 10:
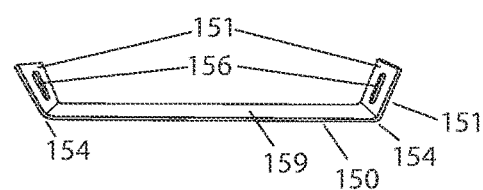
FIG. 10 shows flat stock connection struts.

FIG. 10 shows the strut 150 fabricated out of flat metal material. The holes 156 can range from a circular hole, to a square hole to an ovalized hole (rectangular with radiused ends) to rectangular holes. Diameter dimensions for a round hole range from 0.6 cm to 1.9 cm. Single-side dimension for square holes can range from 0.6 cm to 1.9 cm. For ovalized and rectangular holes the width can range from 0.6 cm to 1.9 cm and the length can range from 0.6 cm to 3.8 cm. The ovalized or rectangular holes are generally oriented longitudinally relative to the struts 150. However they may have a side-to-side orientation. The orientation may vary+/−30 degrees off of the centerline axis or the side-to-side axis. The flanges 151, prior to having a bend 154 formed in them are generally flat and align with plane of a main body of strut 155+/−10 deg. The flange 151 range in length from 1.9 cm to 6.3 cm in length+/−10%. A bend 154 is approximately perpendicular to the longitudinal axis of the main body+/−15 degrees. The bend 154 angle ranges from 60 deg. to 120 deg. The struts 150 from bend 154 to bend 154 ranges in length from 22 cm to 56 cm. The struts 150 fabricated out of flat metal material range in thickness from 0.12 cm to 1.0 cm. and are fabricated with the bend 154 relative to the longitudinal axis of the strut 150.

Construction

Those having ordinary skills in the arts may accomplish building the struts 150 from flat material. Manufacturers of flat metal material manufacture many different standard thicknesses and widths of material and of different types of metal depending on requirements the application. One stock size readily available is available is 0.635 cm thick by 2.54 cm wide. This material will be used to build an example. To build a strut 150 from said material that is 45 cm long from bend 154 to bend 154 with 3.8 cm flanges on either end, one would cut a piece of the material 52.6 cm long with a tool such as a metal shear. Creating the holes 156 may be created with a drill press. Holes 156 for this example may be 0.794 cm in diameter. To form the flanges one should mark the material 3.8 cm in from each end for this example. A metal bending break is a tool that will form the angles in the material at the marked location on both ends to 90 degrees for this example.

Installing struts may be identified in the manufacturers assembly instructions. Generally struts are coupled the to holes in the wheelbarrow tray 153 and the pivot bracket 50 that were specified in the wheelbarrow manufacturer's product specifications. Generally struts are fastened to the tray 153 and the pivot bracket 50 by manufacturer specified nuts and bolts, other fasteners such as, but not limited to, rivets or screws may be used, Additionally permanent bonding to either the pivot bracket 50 or wheelbarrow tray 153 may be carried out by a method, such as but not limited to, welding.

Figure 11:
FIG. 11 shows connection struts fabricated out of metal tube.

FIG. 11 shows the strut 150 fabricated out a tubular metal 157. Construction is very similar to fabrication of above described flat metal stock with the exception of the flanges 151. Those having ordinary skills in the arts may accomplish building an example of the struts 150 from tubular material. For this example tubular steel with a outside diameter of 1.9 cm an a wall thickness of 0.16 cm and a length of 45 cm long will be used. To fabricate the flanges 151 one would mark in 3.8 cm from each end on the tubular material for the flanges and then may use a hydraulic press to flatten the flange 151 sections to predetermined specifications. Holes are created in a like manor as described above. Forming the bends, to predetermined specifications, may be done with a tool such as a vice in conjunction with the operators arm.

Figure 12:
FIG. 12 shows custom shaped connection struts.

FIG. 12 shows the strut 150 formed out of metal and with a custom shape 158. This strut 150 with an custom "C" cross-sectional shape in the strut main body 155 is an example of a strut 150 that would be designed and specified for high volume production. Very expensive and intricate dies would be designed and fabricated. An automated hydraulic press in, a production line, that has a capacity of 500-tons may be used in conjunction with other machinery to carry out the different steps in the process. Fabricating this product may be done single or multiple steps. Raw material of a specified thickness and width will be fed into one side of the production line and a final product ready for deburring and painting will come out the other side of the production line. Example specifications for a custom shape may include: material thickness 0.27 cm, width 3.2 cm, overall length 38 cm, the flange 151 length 4 cm, oval hole 156 width 1.1 cm, oval hole 156 length 2.7 cm, oval hole 156 to end of flange 1.27 cm, height of C cross-sectional shape 0.8 cm. Installation is generally the same as described above for a flat stock strut 159.

Figure 13:
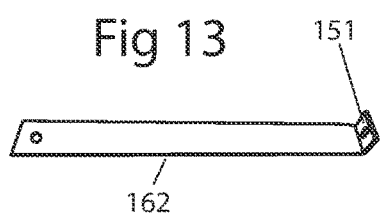
FIG. 13 shows connection struts for side of pivot bracket installation fabricated out of flat material.

FIG. 13 shows a flat material side mount connection strut 162 fabricated from flat metal, however for this application there are generally two struts 162 to installed, one on each side of pivot bracket 50. The flat material side mount connection strut 162 (shown in FIG. 13) is fabricated, to predetermined specifications, generally the same as flat strut 159 with the exception that one of the flange is not bent. For fabrication and installation methods reference methods described for FIG. 10.

Connection Strut Coupling Location Range

Figure 14:
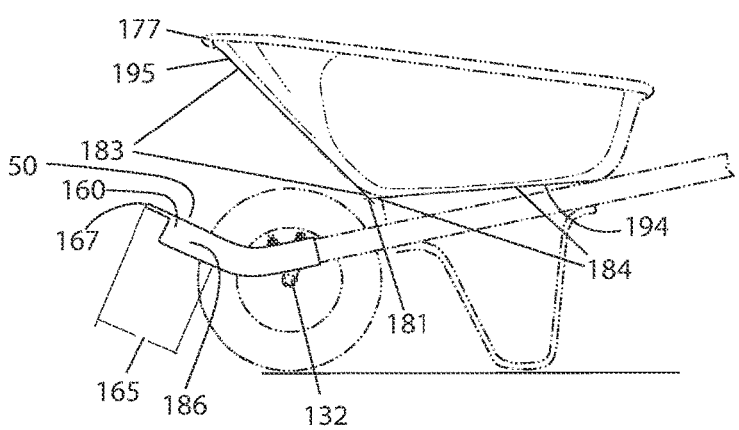
FIG. 14 shows orthogonal side view of a wheelbarrow identifying aspects of the range of coupling for the connection struts to the pivot bracket and the wheelbarrow tray.
Figure 15:
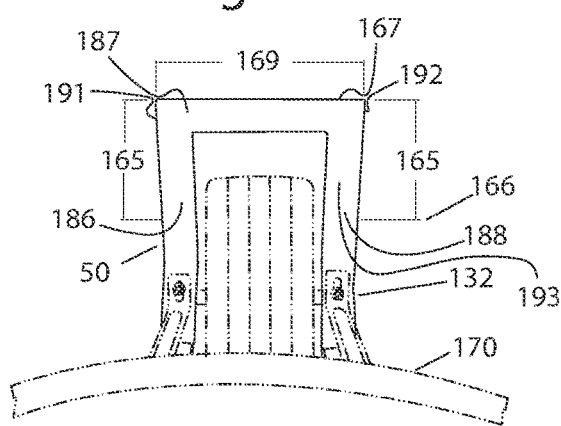
FIG. 15 shows an overhead perspective view of the front of a wheelbarrow identifying aspects of the range of coupling for the connection struts to the pivot bracket and the wheelbarrow tray.
Figure 16:
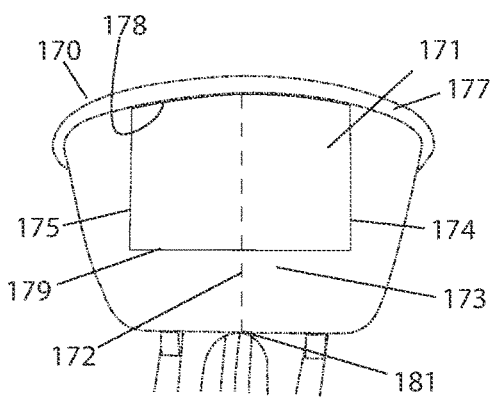
FIG. 16 shows a front perspective view of the front of a wheelbarrow identifying aspects of the range of coupling for the connection struts to the pivot bracket and the wheelbarrow tray.
Figure 17:
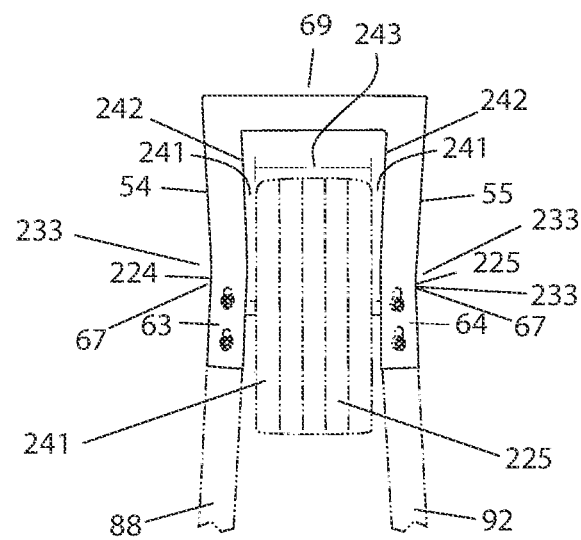
FIG. 17 has been removed.
Figure 18:
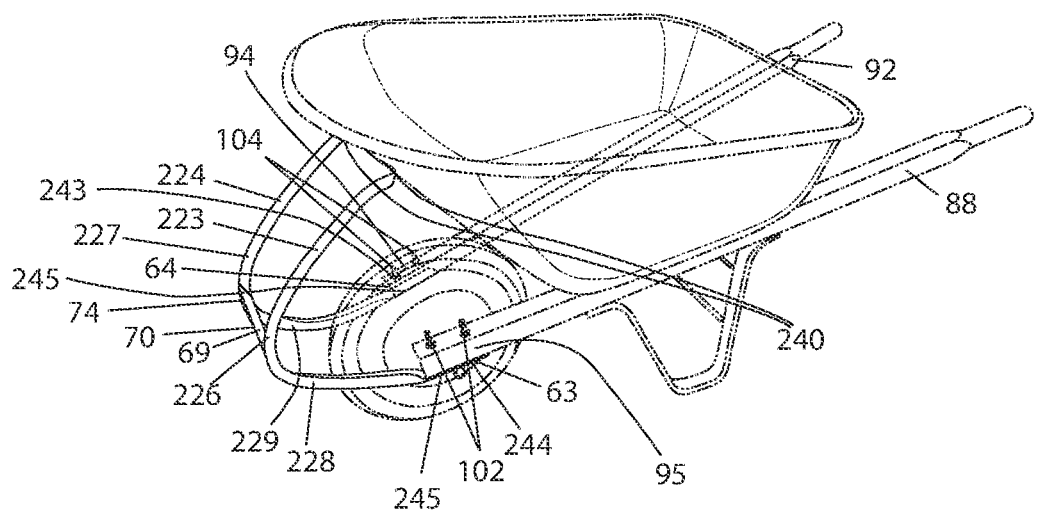
FIG. 18 has been removed.

FIGS. 14, 15, and 16 show three different views of the front area of the wheelbarrow from different perspectives angles. The three views are used to identify the range of coupling between the connection struts 150 and the pivot bracket 50 as well as the connection struts 150 and a front face of the wheelbarrow tray 173. A single or plurality of struts may be used to couple the pivot bracket 50 to a front face of the tray 173. Shown in FIG. 16 is a front partial perspective of the front of a wheelbarrow 170 showing the range of connection for the struts 150 to the front face of the tray is a strut tray connection range 171. The range of connection for the struts 150 to the pivot bracket 50, are defined by a plurality sections comprising a first leg connection range 186, a bight center coupling range 187 and a second leg coupling range 188. On the front face of wheelbarrow tray 173 the side boundaries, for the strut tray coupling range 171, are located on either side of and parallel to, a tray centerline 172. A first vertical tray strut boundary 174 is located 25% of the total width, of the wheelbarrow 170 measured at the widest point of wheelbarrow tray rim 177, to the right side of centerline 172 when viewing the front of the wheelbarrow 170 from a position in front of the wheelbarrow 170.

A second vertical tray boundary 175 is located 25% of the total width, of the wheelbarrow 170 measured at the widest point of wheelbarrow tray rim 177 at its widest point, to the left side of centerline 172 when viewing the front of the wheelbarrow 170 from a position in front of wheelbarrow 170. The upper boundary of the tray strut connection range, a underside of tray rim boundary 178 is the intersection between the tray face 173 and a wheelbarrow tray rim 177 between vertical tray boundary 174 and vertical tray boundary 175. The lower boundary is a bottom strut tray boundary 179. It is perpendicular to the tray centerline 172 and is located 50% of the distance between the tray rim boundary 178 and the front of a tray surface centerline/bottom of tray centerline intersection 181. Shown in FIG. 14 a bottom of tray surface centerline 184 is located in the center of and on the outside bottom surface of the wheelbarrow tray and parallel with the general surface of the bottom of the wheelbarrow tray 170 and the front and back oriented centerline of wheelbarrow 170. A front of tray surface centerline 183 is parallel to tray centerline 172 and is on an outside tray front surface 195, and runs from the tray rim 177 down to front of tray surface centerline/bottom of tray centerline intersection 181. The connection strut or struts 150 can be connected to the tray anywhere within the tray strut connection range 171.

Shown in FIG. 15 is an overhead partial perspective view of the front of wheelbarrow 170 and the pivot bracket 50. The connection strut pivot bracket connection range 170 is divided into a plurality sections, the first leg connection range 186, the bight center connection range 187, and the second leg connection range 188. A first and second leg connection range distance 165 for the first and second leg connection range 186 and 188 is located forward of 50% of the distance between the rotational axis of the wheel 132 and a forward edge of the bight 167. A bight connection range distance 169 spans from a first outside edge of the bight 191 to a second outside edge of the bight 192. The connection struts can be connected to the bight 69 anywhere within the bight connection range 187 and on the top surface of a pivot bracket 193 within the bight connection range 187. The connection struts 150 may be attached anywhere within the first and second leg connection ranges 186 and 188 on the top surface of the pivot bracket 193 within the ranges 186 and 188.

Shown in FIG. 14 the connection struts may be attached to the pivot bracket 50 on a first side surfaces of a leg/bight support section 160 within the first leg connection range 186 or a second side surfaces of the leg/bight support section 161 (shown in FIG. 1) within the second leg connection range 188 (shown in FIG. 15).

FIG. 19 shows a third embodiment of the elevated pivot bracket 50 which is generally fabricated out three pieces of flat stock material and is preferably made of metal material such as steel although those of ordinary skill in the art will recognize that other suitable materials, such as aluminium may be used. The finished dimension lengths, widths, hole size and spacing and upward inclination angles as well as attachment of the leg/handle coupling sections 63 and 64 to the handle/leg coupling sections 94 (shown in FIG. 1), 95 (shown in FIG. 5) are very similar the first embodiment, however it is constructed and the specifications for material are different. Fabricating an example of the third embodiment may be done by those skilled in the arts. To construct said example of the third one would start with flat stock steel that is 2.5 cm wide by 0.476 cm thick and cut three pieces. For the bight 69, a 22 cm piece and two pieces 75 cm long for the first and second support legs 52, and 53. The holes 96 would first be drilled with a tool such as a drill press; one hole 96 in the middle of the support legs 52 and 53, both length wise and side-to-side for attaching the bight 69 to the support legs 52 and 53. Holes 96 need to be created in each end of the Bight 69. They are to be located at predetermined locations and sizes. Holes 96 to attach the support legs to the handles 88 and 92 are as described for the first embodiment for positioning, with the difference that there are holes 96 required in both a upper portion 196 and a lower portion 197 of the support legs 52 and 53 at predetermined locations and of predetermined specifications. A tool such as a Hossfeld bender may be used to put the bends in the support legs 52 and 53. Two 90-deg bends are put in 1.3 cm on either side of the hole in the center on each support legs 52 and 53. The remaining bends to create the upward incline to predetermined specifications. Finishing will be done as identified for the first embodiment.

Installation

Installing pivot bracket 50 is very similar to the first embodiment with some exceptions comprising that the bight 96 requires a plurality of fasteners to connect the bight to the support legs 52 and 53. The upper portions of the support legs 196 are positioned on the top surface of the handles 116 and the lower portion of the support legs 197 is positioned on a lower surface of the handles 117 (shown in FIG. 5). The axel brackets 99 are positioned such that the lower portion of the support legs 197 is sandwiched between the lower surface of the handles 117 and the axel brackets 99. The method of fastening the pivot bracket to handles 88 and 92 for the first embodiment may be used for this embodiment.

FIG. 20 shows a fourth embodiment of the elevated pivot bracket for wheelbarrow 50 which is fabricated out of a single piece of metal material such as, but not limited to, steel and formed into the pivot bracket 50. It is very similar to the first embodiment with the exception of how it is made. Very expensive and intricate dies would be designed and fabricated. An automated hydraulic press in, a production line, that may have a capacity of 500-tons or more and may be used in conjunction with other machinery to carry out the different steps in the process. Fabricating this product may be done single or a plurality of steps. Raw material of a specified thickness and width will be fed into one side of the production line and a final product ready for deburring and painting will come out the other side of the production line. Fabricating an example of the fourth embodiment may be done by those skilled in the arts. The material specifications may be very similar to the first embodiment with the difference being that instead of three individual pieces one long single piece would be specified. The length range is generally between 70 cm to 126 cm. Finishing, installation and operation can be the same as the used for first embodiment. To fabricate an example of the fourth embodiment one would start with a piece of steel that has a width of 9 cm, a material thickness of 0.24 cm and a length of 100 cm. The material would be fed into one side of the production line and on the other side a product would come out ready for finishing and installation. Finishing options are the same as for the first embodiment. For this example the pivot bracket will be sanded and painted. Installation and operations can be the same as for the first embodiment.

FIG. 21 shows a fifth embodiment of the elevated pivot bracket 50, which may be fabricated out of a single piece of material and formed into the pivot bracket 50. Fabricating an example of the fifth embodiment may be done by those skilled in the arts. It is very similar to the fourth embodiment with the differentiation being the bight 69 section of the pivot bracket 50 is a radius connecting the first and second support legs 52, 54 instead of being straight. To build an example of the fifth embodiment one would start with a piece of 1.5" angle iron that is 100 cm long and has sides of 5 cm and a material thickness of 0.48 cm. A radius of 18 cm. for the bight and 15 degree bends for the upward incline angle in the upwards incline transition section 67 may be formed with a tool such as a Hossfeld Bender. A tool such as a hole punch may be used to create the holes 96 of this embodiment at predetermined locations. Finishing options and installation are the same as for the first embodiment.

FIG. 22 shows a sixth embodiment of the elevated pivot bracket 50, which may be fabricated out of a single piece of material and formed into the pivot bracket 50. It is very similar to the fifth embodiment in that the bight 69 section of the pivot bracket 50 is a radius connecting the first an second support legs 52, 54 instead of being fabricated in straight sections, however it is made out of round material and it is coupled to a outside surface of the handle 111 or a inside surface of the handle 112 (shown in FIG. 6) of the handles 88 and 92 (shown in FIG. 1) at the first and second handle/leg coupling section 94 (shown in FIG. 1), 95 (Shown in FIG. 5). Further the plurality of fasteners coupling leg/handle coupling section of the pivot bracket 50 to the leg/handle coupling sections 95 (shown in FIG. 1) and 94 shown in (FIG. 5) are aligned horizontally. The material may be round (shown in FIG. 22) although those of ordinary skill in the art will recognize that other suitable materials may be used such as square, oval, rectangle ect. The round material is preferably made of metal material, such as iron, steel, aluminium etc., although those of ordinary skill in the art will recognize that other suitable materials may be used, such as glass reinforced plastic, carbon fiber, or plastic. The round material may be solid, however it may be hollow as well. The outside diameter of the round material may range from 1.3 cm to 5 cm. If the material is hollow the wall thickness may range from 0.25 cm to 0.65 cm. The length of the material may range from 60 cm. to 120 cm. A plurality of holes may be created in each of the leg/handle coupling sections 97, 98. Holes 96 can range from a circular hole, to a square hole to an ovalized hole (rectangular with radiused ends) to rectangular holes. Diameter dimensions for a round hole range from 0.6 cm to 1.9 cm. Single side dimension for square holes can range from 0.6 cm to 1.9 cm. For ovalized and rectangular holes the width can range from 0.6 cm to 1.9 cm and the length can range from 0.6 cm to 3.8 cm. The orientation of holes on the flattened surface may have a front to back as well as a side-to-side orientation+/−30 degrees.

Fabrication

Fabricating an example of the sixth embodiment may be done by those skilled in the arts. This example can be made out of tubular material 10.9 cm in outside diameter with a wall thickness of 0.125 cm and is 100 cm in length is described below. A section of tube is cut to 100 cm in length with a tool such as a hacksaw. A mark should be made 13 cm in from each end to define the range the leg/handle coupling sections 97, 98 and can be flattened by a tool such as a hydraulic press such that the two flat surfaces are on the same plane. Two holes will be put in each of the flattened leg/handle coupling sections 97, 98. For this example holes 96 are 0.95 cm in dia. and drilled in 2 cm and 10 cm in from the end of the along the centerline of the flattened sections with a tool such as a drill. A tool such as a Hossfeld Bender may be used to put the bend in the tube material between the flattened leg/handle coupling sections 97, 98. A 170-degree arc will be put in the middle of the material, to predetermined specifications, in a manor that when completed the flattened leg/handle coupling sections 94, 95 will have parallel vertical surfaces. A 25-degree upward angle, in the upwards incline transition section 67, will be formed into in the tube section starting 3 cm after each of the flattened leg/handle coupling sections 97 and 97 with a tool such as a Hossfeld Bender. The flattened leg/handle coupling sections 97 and 98 will have a small inward bend formed in them, to predetermined specifications, with a tool such as a vise to make them conform with the first and second handle/leg coupling sections 94 (shown in FIG. 1), 95 (shown in FIG. 5). As used herein, the word "conform" means that two or more elements are structured to have one element disposed snugly within the other element. Thus while both elements have a similar or complementary cross-sectional shape, the inner element is slightly smaller than the outer element. Finishing options are the same as for the first embodiment.

Installation

The handles need to be the specified length. Holes 96.95 cm in diameter will need to be drilled horizontally through handles aligned with the longitudinal centerline of the outside surface of the handle 111 (shown in FIG. 34-41) outside face of the in the handles 88, 92 (shown in FIG. 1)

in the first and second handle/leg coupling sections 94 (shown in FIG. 1) and 95 (shown in FIG. 5). The holes will be drilled, with a tool such as a drill, 8 cm apart and in the first and second handle/leg coupling sections 94 (shown in FIG. 1) and 95 (shown in FIG. 5) utilizing a tool, such as a drilling jig, to ensure proper positioning and alignment. Fasteners such as bolts and nuts of a diameter of 0.9 cm in dia. and a length between 15 cm and 80 cm may be used to securely couple the sixth embodiment of pivot bracket 50 to the wheelbarrow 83 (shown in FIG. 1).

FIG. 23 shows a seventh embodiment of the pivot bracket 50 made out of flat material. It is very similar to the six embodiment in that it can be fabricated out of a single piece of material and may be fabricated using the same tools and length, hole, angle dimensions as well as installation methods. It differs in a plurality of places comprising the bight 69 is straight similar to the first embodiment, and the material is flat instead of round, and the flattening of the tube material would not need to be done. The seventh embodiment may be fabricated with a radiused or other shape for the bight 69 section. As with the sixth embodiment it can be mounted to either the outside surface of the handle 111 or the inside surface of the handle 112 (shown in FIG. 6).

Fabrication

Fabrication of an example of the seventh embodiment may be accomplished by those having ordinary skills in the arts. Materials for an example would comprise a piece of 3.8 cm flat stock steel with a material thickness of 0.32 cm and a length of 100 cm. A tool such as a Hossfeld Bender may be used to put the bends in to create the bight 69 as well as the bend in the upwards incline transition section 67 to predetermined specifications. The holes 96 can be created with a tool such as a hole punch to predetermined specifications and locations. Finishing options are the same as for the first embodiment.

Installation

Installation for the seventh embodiment can be the same as for the sixth embodiment.

FIG. 24 shows an eighth embodiment that is very similar to the seventh embodiment. There are a plurality of differences compromising there are two pieces of material that conform to each other in the bight 69 area, the inner leg portions 61 (shown in FIG. 24) are coupled to the inside surface of the handle 112 the handles 88 and 92 (shown in FIG. 1) in the first and second handle/leg coupling sections 94 (shown in FIG. 1) and 95 (shown in FIG. 5). The outer leg portions 62 are connected to the outside surface of the handle 111 (shown in FIG. 6). The two pieces are coupled together in a bight/leg coupling area 200 although those of ordinary skill in the art will recognize that other methods of fastening the pieces together such as riveting and welding, ect. The material lengths, bend angles, hole diameters and fabrication methods used to fabricate the seventh embodiment are very similar.

Fabrication

Fabrication of an example of the eighth embodiment may be accomplished by those having ordinary skills in the arts. Materials for an example would comprise two pieces of 3.8 cm wide flat stock steel with a material thickness of 0.32 cm and lengths of approximately 100 cm. A tool such as a Hossfeld Bender may be used to put the bends in to create the bight as well as the upwards incline bend in the upwards incline transition section 67 to predetermined specifications. The holes 96 can be created with a tool such as a hole punch to predetermined specifications and locations. Finishing can be the same as identified for the first embodiment.

Installation

Installation for the eighth embodiment can be the same as for the seventh embodiment with the difference being the inner leg portions 61 (shown in FIG. 24) are coupled to the inside surface of the handle 112 of the handles 88 and 92 (shown in FIG. 1) in the first and second handle/leg coupling sections 94 (shown in FIG. 1) and 95 (shown in FIG. 5). The outer leg portions 62 are connected to the outside surface of the handle 111 (shown in FIG. 6). Fasteners of predetermined specification are used.

FIG. 25 shows a ninth embodiment of the pivot bracket 50 and can made of a single piece of material and is very similar to the first embodiment with a plurality of differences comprising its method of manufacturing, the materials used, ect. All of the finished product specifications identified for the first embodiment may be used for this embodiment, adjusted accordingly for the specific material being used, comprising length, width, material thickness, hole characteristics, and angles, e ct.

Fabrication

The ninth embodiment may be 3-D printed, although those of ordinary skill in the art will recognize that other suitable means of fabricating such as casting, injection molding, molding, ect are possible. 3-D printing may fabricate the pivot bracket 50 out of plastic, although those of ordinary skill in the art will recognize that other suitable materials may be used such as ABS, resigns and polyamide, ect, metals such as stainless steel, aluminium, and ceramics, ect. Molding and casting may use materials like plastic, although those of ordinary skill in the art will recognize that other suitable materials may be used such as aluminium, fiberglass reinforced plastic, ect. An example of the ninth embodiment may be accomplished by those having ordinary skills in the arts. For the example it will be 3D printed using glass reinforced plastic (GRP) to predetermined specifications. The end result will have the same support legs 52 and 54, and bight 69 lengths and upwards incline 67 angel as the first embodiment. Finishing for this example will be painting. Installation and operations are the same as the first embodiment.

Figure 27:
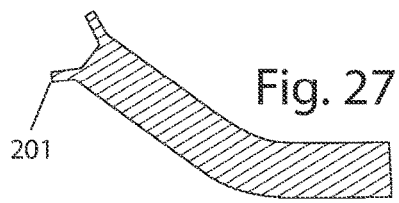
FIG. 27 shows a cross-sectional view of the bight and support leg with a modified C shaped bight.
Figure 28:
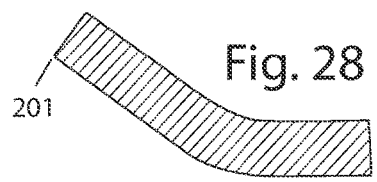
FIG. 28 shows a cross-sectional view of the bight and support leg with a straight bight.
Figure 29:
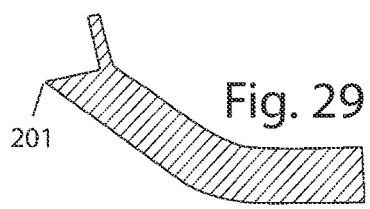
FIG. 29 shows a cross-sectional view of the bight and support leg with a modified C shaped bight that has a tipped back orientation.
Figure 30:
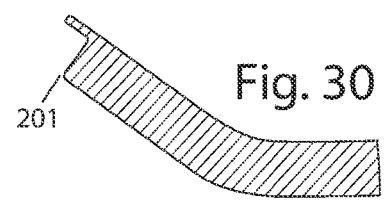
FIG. 30 shows a cross-sectional view of the bight and support leg with a modified L shaped bight like the first embodiment.
Figure 31:
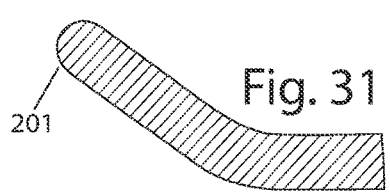
FIG. 31 shows a cross-sectional view of the bight and support leg with a radiused shaped bight.

FIGS. 27, 28, 29, 30, and 31 show cross-sectional views of a support leg 52 or 54 (shown in FIG. 2) and a bight 69 and a bight lower edge or surface 201. FIG. 27 is a modified C-shape, FIG. 28 is straight-shape, FIG. 29 is an L-shape with an orientation that is angled back, FIG. 30 is an L-shape that is the cross-section shown in the first embodiment shown in FIG. 1. FIG. 31 is a half circle-shape. These are some of the possible shapes for the bight 69 cross-section, however those of ordinary skill in the art will recognize that other suitable shapes and deployments may work.

Figure 32:
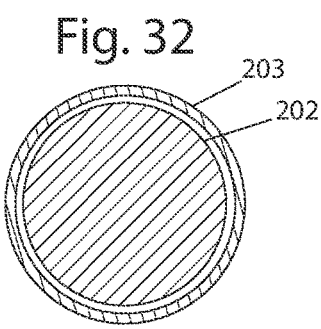
FIG. 32 shows round cross-sectional views of handles and a round cross-sectional view of a support leg.
Figure 33:
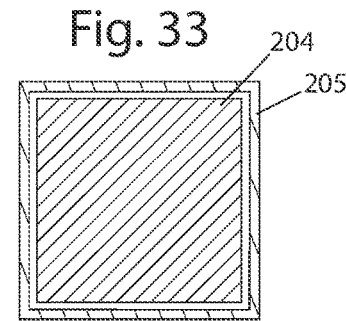
FIG. 33 shows rectangular cross-sectional views of handles and a rectangular cross-sectional view of a support leg.
Figures 34, 35:
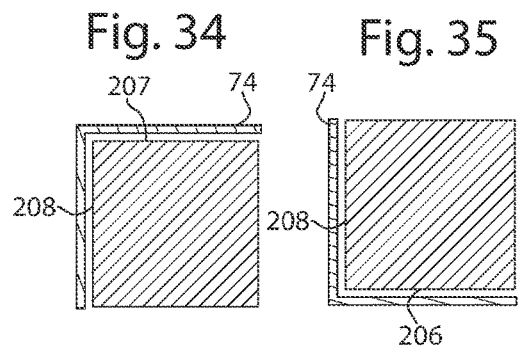
FIG. 34 shows a rectangular cross-sectional views of handles and a first version how a L cross-sectional shape may be oriented to the handles.
FIG. 35 shows a rectangular cross-sectional views of handles and a third version how a L cross-sectional shape may be oriented to the handles.
Figures 36, 37:
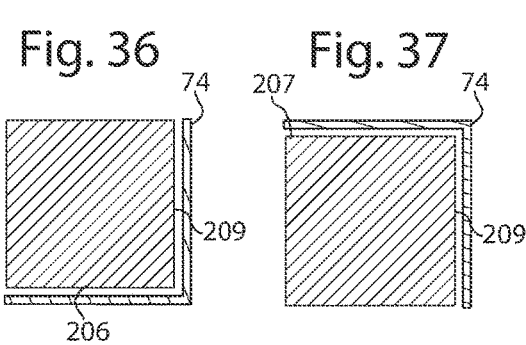
FIG. 36 shows a rectangular cross-sectional views of handles and a third version how a L cross-sectional shape may be oriented to the handles.
FIG. 37 shows a rectangular cross-sectional views of handles and a fourth version how a L cross-sectional shape may be oriented to the handles.

FIGS. 32, 33, 34, 35, 36, 37, 38, 39, 40, and 41 are cross-sectional views of solid handles 88 and 92 (shown in FIG. 1) at the handle/leg support section 95 (shown in FIG. 5) and 94 (shown in FIG. 1). The handles 88 and 92 could be tubular as well. FIG. 32 shows a cross-section of round material 202 for the support leg at leg/handle coupling section 63 and 64 and a cross-section of round support leg at leg/handle coupling section 203. FIG. 33 shows cross-section of rectangle support leg at leg/handle coupling section 204 and cross-section of rectangle support leg at leg/handle coupling section 205. There are different orientations that U cross-section shape 115, and L cross-sectional shape 74, for the leg/handle coupling section 63 and 64 sections of the pivot bracket support legs 52 and 53 (shown in FIG. 2) may be coupled to the handle/leg coupling sections 94 (shown in FIG. 1) and 95 (shown in FIG. 5). FIG. 34 shows the L cross-section 74 adjacent to a right handle surface 208 and a top handle surface 207, FIG. 35 shows the L cross-section 74 adjacent to a right handle surface 208 and a bottom handle surface 206, FIG. 36 shows the L cross-section 74 adjacent to a left handle surface 209 and the bottom handle surface 206, FIG. 37 shows the L cross-section 74 adjacent to the left handle surface 209 and the top handle surface 207.

Figure 38:
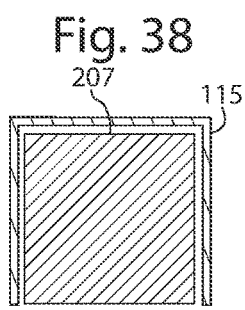
FIG. 38 shows a rectangular cross-sectional views of handles and a first version how a U cross-sectional shape may be oriented to the handles.
Figure 39:
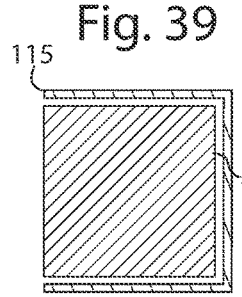
FIG. 39 shows a rectangular cross-sectional views of handles and a second version how a U cross-sectional shape may be oriented to the handles.
Figure 40:
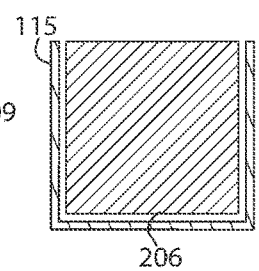
FIG. 40 shows a rectangular cross-sectional views of handles and a third version how a U cross-sectional shape may be oriented to the handles.
Figure 41:
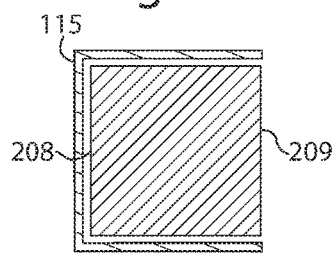
FIG. 41 shows a rectangular cross-sectional views of handles and a fourth version how a U cross-sectional shape may be oriented to the handles.

The U cross-section that may be used for the support legs 52 and 53 in the first embodiment and be mounted on any three adjacent sides. FIG. 38 shows the U cross-section 115 used for the support legs in the first embodiment with the center-section coupled to the top handle surface 207. FIG. 39 shows the U cross-section 115 with the center-section coupled to the left handle surface 209, FIG. 40 shows the U cross-section 115 with the center-section coupled to the bottom handle surface 206, FIG. 41 shows the U cross-section 115 with the center-section coupled to the right handle surface 208.

Figure 42:
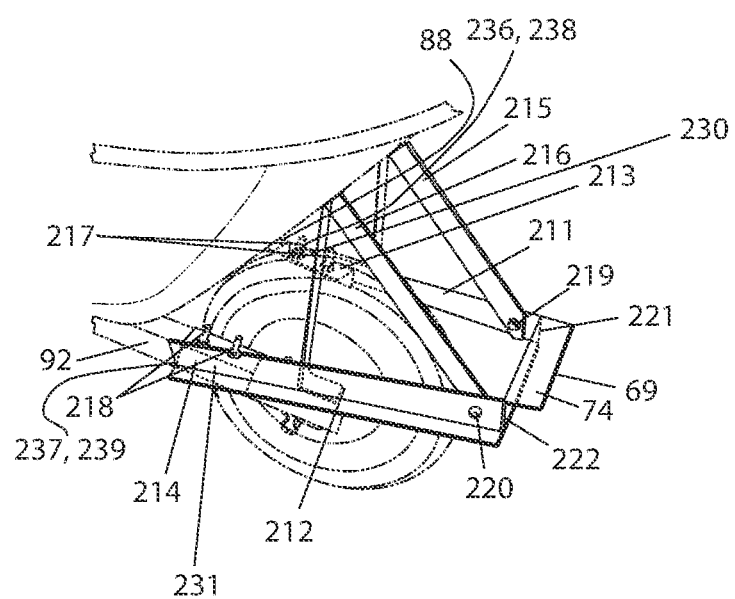
FIG. 42 show partial side perspective the front of a wheelbarrow showing the eleventh embodiment of a pivot bracket mounted on a wheelbarrow.

FIG. 42 shows the eleventh embodiment made out of a plurality of sections very similar to the second embodiment (shown in FIG. 9) that incorporates connection struts. However the eleventh embodiment is coupled to the handles 88 and 92 behind the axle and may overlap the handle/leg coupling section 95 and 94 (shown in FIG. 44) used in the first ten embodiments. A first alternative coupling section 230 and a second alternative coupling section 231 may be an option for other pivot bracket 50 embodiments. The alternative coupling sections 230 and 231 are located in a range and defined by a range, on both handles 88 and 92, that is defined on the forward end by plane that runs through the rotational axis of the wheel 132 (shown in FIG. 5) and the back end is 20 cm behind the rotational axis of the wheel 132. A first leg/handle coupling bracket 213 and a second leg/handle coupling bracket 214 may attach to a single or plurality of longitudinally oriented surfaces of handles 88 and 92 as shown in, but not limited to, FIGS. 32, 33, 34, 35, 36, 37, 38, 39, 40, and 41.

The eleventh embodiment of the pivot bracket 50 can be formed as a L cross-sectional shape 74 and is preferably made of metal material, such as iron, steel, aluminium etc., although those of ordinary skill in the art will recognize that other suitable materials may be used, such as glass reinforced plastic, carbon fiber, or plastic. The L cross-sectional shape is used, although those of ordinary skill in the art will recognize that other shapes or combination of shapes are suitable such as, but not limited to, a U cross-sectional shaped member 115 (shown in FIGS. 38, 39, 40, and 41) may be used. There are a plurality of parts and sections comprising the first leg/handle connection bracket 213, a first support leg 211, a first connection strut 215, bight 69, the second connection strut 216, a second support leg 212, a second leg/handle connection bracket 214. The lengths, widths, thicknesses, and hole specifications for the parts are similar to the first embodiment with the main exception being the lengths of the support legs 211 and 212. Their length may range from 25 cm to 65 cm. The support legs 211 and 212 are coupled to the connection brackets 213 and 214. The angle range of the connection bracket relative to the connection strut, is minus 5-deg to plus 15-deg, is measured between the longitudinal axis of handles 88 and 92 and the longitudinal axis of the support legs 211 and 212. The support legs 211 and 212 are coupled to the bight 69 at a first support leg/bight connection section 221 and a second support leg/bight coupling section 222. The connection struts are connected to the support legs as described for the second embodiment. FIG. 42 is an example of one of many ways to fabricate a pivot bracket who's attachment to the handles 88, 92 in the first and second alternative coupling section 230 and 231 located behind the rotational axis of the wheel 132. Most of the prior embodiments could adapted/engineered to be attached behind the rotational axis of the wheel.

Fabricating an example of the eleventh embodiment may be may be accomplished by those having ordinary skills in the arts. Example specifications and fabrications methods for one version of the pivot bracket 50 of this embodiment comprising a first leg/handle connection bracket 213 and a second leg/handle connection bracket 214 (shown in FIG. 42) needing two pieces use 3.8 cm by 5 cm by 0.3175 cm angle iron 12 cm long. A first support leg 211 and a second support leg 212 (shown in FIG. 42) requiring two pieces of angle iron 2.5 cm by 2.5 cm by 0.3175 cm by 45 cm, the bight 69 requiring one piece of angle iron 2.5 cm by 2.5 cm by 23 cm, a first connection strut 215 and a second connection strut 216 (shown in FIG. 42) requiring two pieces 2.5 cm by 0.476 cm by 27 cm long including 3.8 cm for the flange 151 (shown in FIG. 13). The individual pieces may be cut to length by a machine such as a metal shear. Holes 96 are created in the connection brackets 213 and 214 by a tool such as a drill press. Holes 96 for this example will be 0.95 cm in diameter and are 1.9 cm in from each of the cut edges on the longitudinal centerline of the brackets. As described above in the pivot bracket 50 second embodiment holes 96 are created in the leg/bight connection section 221 to couple the support legs 212 and 211 to the connection struts 215 and 216, as well as in the connection struts 215 and 216 to predetermined specifications.

All pieces should be clamped in a in a tool such as a fabrication jig, and then the pieces are bonded with a tool such as a welder to predetermined specifications. Holes 96 for the connection brackets 213 and 214 are marked on the handles 88 and 92, in predetermined locations, and holes drilled in handle 88 and 92 to 0.95 cm dia. with tool such as a drill in conjunction with a drilling jig to ensure proper positioning and alignment. Pivot bracket 50 and connection struts are finished as described in the first embodiment.

Installation

Once finished the pivot bracket is installed on handles 88 and 92 using a first connection brackets fastener 217 and a second connection brackets fastener bolts 218 such as 0.9 mm×5 cm bolts and lock nut and tightened to fastener manufacturer specifications, although those of ordinary skill in the art will recognize that other fastening materials may be suitable. The connection struts 215 and 216 are installed as described in the second embodiment.

FIG. 43 shows a twelfth embodiment that is very similar to the first embodiment, with the difference being the pivot bracket is fabricated to accommodate wider wheels. The wheelbarrow industry standard wheel is 40.1 cm+/−10% in diameter by 10.2 cm in width+/−10%. Wheelbarrow manufacturers may specify wheel/tires 241 that are wider such as, 15 cm+/−10% in width on some of their models for reasons comprising carrying heavier weights or using on sensitive surfaces such as golf courses. To adapt the first embodiment to allow for a wider tire 225 the support legs 54 and 55 would have a outwards inclination 233 ranging between 5-deg and 15-deg measured on the longitudinal axis of the support leg/bight section 55 and 58 and the longitudinal axis of the leg/handle coupling section 63 and 64 forward of the leg/handle coupling sections 63 and 64. An outward inclination 233 would be located in a first outward compound bend area 234 and a second outward compound bend area 235 forward of the leg/handle coupling sections 63 and 64.

Fabricating an example of the twelfth embodiment may be accomplished by those having ordinary skills in the arts.

The process and specifications used to fabricate the first embodiment may be used for the twelfth embodiment with a few changes. An outward inclination 233 will be formed in the support legs 54, 55 in the first outward compound bend area 234 and the second outward compound bend area 235 to predetermined specifications. The width of the bight 69 for this example will be 30 cm. Fabricating, finishing and installation, and operation of this embodiment may be the same as the first embodiment.

FIG. 44 shows a thirteenth embodiment that positions the bight 69 in the range of location 120 in a different way than prior embodiments. As with all pivot bracket 50 embodiment the handles 88 and 92 must be specified to the correct length for new wheelbarrow manufacturing, or in retrofit installations, if needed, adjusted so they are the correct length as described in the first embodiment. This embodiment combines a first support leg section 228 and a first connection strut section 223 into a first pivot bracket leg 226 which may be fabricated out of a single piece of material. A second support leg section 229 and a second connection strut section 224 are combined into a second pivot bracket leg 227 which may be fabricated out of a single piece of material.

The first leg/handle coupling section 63 is coupled to the first handle/leg coupling section 95 of handle 88. The second leg/handle coupling section 64 is coupled to the second handle/leg coupling section 94 of handle 92.

An upper connection strut section flanges 240 are connected to the wheelbarrow tray forward face 173 in the strut tray connection range 171 (shown in FIG. 16).

Figure 6:
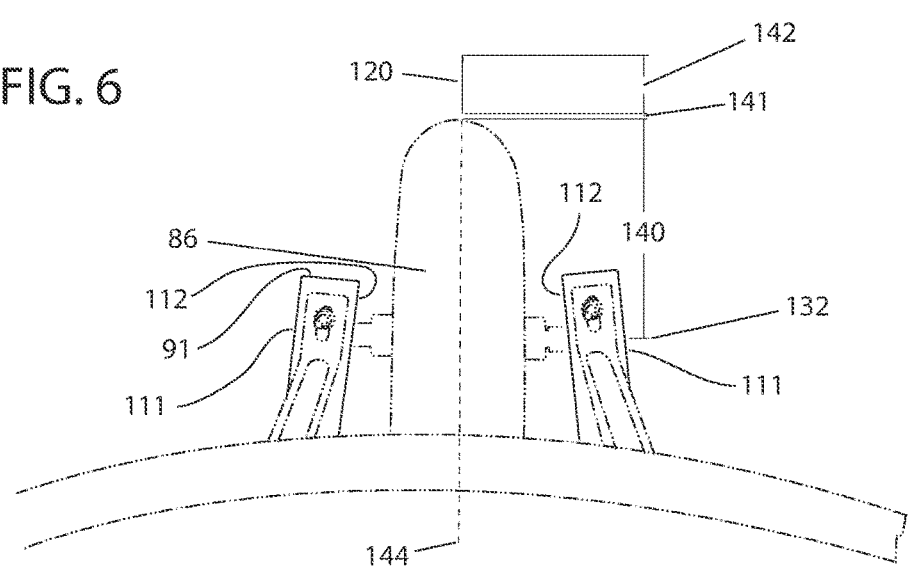
FIG. 6 shows an overhead perspective view of the front section of a wheelbarrow, with the pivot bracket removed, identifying an overhead perspective of the location of the range of location relative to the tire and the centerline of the wheel and wheelbarrow

The bight 69 is located between the pivot bracket legs 226 and 227 positioning the bight lower forward surface 70 in the range of location 120 (shown in FIGS. 5 and 6).

Fabricating the thirteenth embodiment is similar to the construction of the sixth embodiment of the pivot bracket 50 (shown in FIG. 22). The pivot bracket legs 226 and 227 are constructed out of a round metal material, although those of ordinary skill in the art will recognize that other suitable materials may be used, such as glass reinforced plastic, carbon fiber, or plastic as well as other shapes are suitable such as, but not limited to, a U cross-sectional shaped member 115 (shown in FIGS. 38, 39, 40, and 41). The shapes may be solid or hollow. The pivot bracket bight 69 formed as a L cross-sectional shape 74 and is preferably made of metal material, such as iron, steel, aluminium etc., although those of ordinary skill in the art will recognize that other suitable materials may be used, such as glass reinforced plastic, carbon fiber, or plastic. Other shapes are suitable such as, but not limited to, a U cross-sectional shaped member 115 (shown in FIGS. 38, 39, 40, and 41) and shapes may be solid or hollow.

Fabricating an example of the thirteenth embodiment may be accomplished by those having ordinary skills in the arts. Said example has specifications comprising two pieces of hollow metal tube having a 2.95 cm outside diameter and a wall thickness of 0.124 cm that are 76 cm long. A bight 69 cut out of a piece of angle iron that is 3.8 cm by 3.8 cm by 0.3175 cm and is 7.5 cm long. One end, 13 cm long, of the hollow metal tube, on both 76 cm pieces, will need to be flattened to create the first and second leg/handle connection sections 95 and 94 with a hydraulic press or other suitable tool. The other ends, 6 cm long, will need to be flattened at an orientation of 90 degrees relative to the leg/handle connection sections 95 and 94 with a hydraulic press or other suitable tool to create the upper connection strut section connection flanges 240. A plurality of holes will need to be put into the leg/handle connection sections 95 and 94 aligning with the centerline axis of the flattened section of the leg/handle connection sections 95 and 94 and 6 cm apart with one hole in 2.5 cm from the end of the leg/handle connection sections 95 and 94, for this example the holes should be 0.95 cm in diameter. Another hole in each of the strut flanges needs to be created for this example the holes should be 0.95 cm in diameter. The hole should be centered relative to the flat section longitudinal axis and in 3 cm from the end.

C-shaped bends will need to be put into the metal tubes to approximate the shape of the pivot bracket section shape 226, to predetermined specifications, (shown in FIG. 44) with a tool such as a Hossfeld Bender. To properly align the strut flange to the wheelbarrow tray forward face 173 in the strut tray connection range 171 (shown in FIG. 16) the strut flanges 240 will need to be custom formed with a tool such as a vice and the operators arm. For this example the strut flanges will be initially bent to, approximately 90 degrees before the final fitting. All of the pieces will be put in a fabrication jig and bonded with a tool such as a welder. This example will be finished the same as the first embodiment.

Installation

To install this embodiment the axel connector fasteners 102 and 104 should be removed and the flattened section of the leg/handle coupling sections 95 and 94 placed between an axel bracket 244 and the bottom surface of the handles 117. The axel connector fasteners 102 and 104 should be replaces and tightened to manufacturers specification. The strut flange should be fastened as described above for the second embodiment (shown in FIG. 9).

As used herein, directional terms such as, but not limited to, "forward," "back," "upper," "lower," "above," "below," "upward," "downward" and other like descriptions correspond to the orientation of the wheelbarrow from the perspective of a user standing at the handle portion looking towards the tray—that is the normal position a operator would occupy to move the wheelbarrow. Such directional terms are not limiting upon the claims.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

As used herein, directional terms such as, but not limited to, "forward," "back," "upper," "lower," "above," "below," "upward," "downward" and other like descriptions correspond to the orientation of the wheelbarrow from the perspective of a user standing at the handle portion looking towards the tray—that is the normal position a operator would occupy to move the wheelbarrow. Such directional terms are not limiting upon the claims.

The invention claimed is:

1. A combination of a wheelbarrow with a pivot bracket, comprising:

said wheelbarrow having handles with opposed end sections, at least one wheel rotatable around a rotational axis, and a cargo carrying bin mounted over the wheel; and said pivot bracket interconnecting the opposed end sections, the pivot bracket extending forward of the wheelbarrow, the pivot bracket including spaced first and second support legs, each of the first and second support legs having opposed forward and back end portions, the back end portions of the first and second support legs being attached to the opposed end sections of the handles, the pivot bracket further including a bight attached to the forward end portions of the first and second support legs, the bight being capable of engaging the ground and positioned such that the bight is located forward of the wheel and above the rotational axis of the wheel when the wheelbarrow rests on a level surface without being tilted forward, and, when the wheelbarrow is tilted forward on the level surface, the bight makes contact with the level surface.

2. The combination of a wheelbarrow with a pivot bracket of claim 1 where the back end portions of the first and second support legs are attached to the opposed end sections of the handles in handle/leg coupling sections that are each located between a position forward of the rotational axis of the wheel and a position behind the rotational axis of the wheel.

3. The combination of a wheelbarrow with a pivot bracket of claim 1 where the bight is positioned forward of the wheel by a distance between approximately one inch and approximately five inches.

4. The combination of a wheelbarrow with a pivot bracket of claim 3 where the bight is positioned above the rotational axis of the wheel by a distance less than approximately four inches when the wheelbarrow rests on a level surface without being tilted forward.

5. The combination of a wheelbarrow with a pivot bracket of claim 1 where the bight and is positioned above the rotational axis of the wheel by a distance less than approximately four inches when the wheelbarrow rests on a level surface without being tilted forward.

6. The combination of a wheelbarrow with a pivot bracket of claim 1 where each forward end portion of the first and second support legs is spaced apart from a sidewall of the wheel by a distance between approximately 0.75 inches and approximately 1.5 inches.

7. The combination of a wheelbarrow with a pivot bracket of claim 1 where the pivot bracket is U-shaped.

8. The combination of a wheelbarrow with a pivot bracket of claim 1 where the handles extend forward of the rotational axis by a distance less than 12 cm.

9. The combination of a wheelbarrow with a pivot bracket of claim 1 where the back end portions of the first and second support legs are attached to is the opposed end sections of the handles in handle/leg coupling sections that are each located between approximately 12-cm forward of the rotational axis and approximately 20 cm behind the rotational axis of the wheel.

10. The combination of a wheelbarrow with a pivot bracket of claim 1 where the pivot bracket is detachable from the wheelbarrow.

11. The combination of a wheelbarrow with a pivot bracket of claim 1 where the forward end of the handles do not extend forward of the rotational axis of the wheel by more than approximately 12 cm.

12. The combination of a wheelbarrow with a pivot bracket of claim 1, where the pivot bracket connects to the handles no more forward than approximately 12-cm forward of the rotational axis of the wheel.

13. The combination of a wheelbarrow with a pivot bracket of claim 1, where the pivot bracket connects to the handles no more backward than approximately 20-cm behind the rotational axis of the wheel.

\* \* \* \* \*